United States Patent [19]

Pesikov

[11] Patent Number: 4,802,774
[45] Date of Patent: Feb. 7, 1989

[54] GAS BEARING FOR GUIDING RELATIVE MOVEMENT OF PRECISION MACHINE PARTS

[75] Inventor: Vitaly I. Pesikov, Providence, R.I.

[73] Assignee: Brown & Sharpe Manfacturing Co., No. Kingstown, R.I.

[21] Appl. No.: 108,143

[22] Filed: Oct. 14, 1987

[51] Int. Cl.⁴ ............................................. F16C 32/06
[52] U.S. Cl. ...................................... 384/12; 384/100
[58] Field of Search ...................... 384/12, 7, 9, 10, 13, 384/37, 100, 99, 121, 121, 122, 124, 306-312

[56] References Cited

U.S. PATENT DOCUMENTS

| | | | |
|---|---|---|---|
| 3,578,827 | 5/1971 | Smith | 384/12 |
| 3,717,392 | 2/1973 | Ennis | 384/12 |
| 3,744,858 | 7/1973 | Weichsel | 384/12 |
| 4,174,136 | 11/1979 | Hallstedt | 384/100 X |
| 4,378,134 | 3/1983 | Eddy | 384/12 |
| 4,643,590 | 2/1987 | Olasz | 384/12 X |

Primary Examiner—Daniel P. Stodola
Assistant Examiner—Thomas R. Hannon
Attorney, Agent, or Firm—Wolf, Greenfield & Sacks

[57] ABSTRACT

In a precision machine, such as a coordinate measuring machine or a machine tool in which a carriage rides along a rail, a gas bearing for applying a constant preload force to a bearing shoe over a range of relative movement between said bearing shoe and the carriage to accommodate imperfections and non-parallelism in the rail. The constant preload force is provided by a disc spring, which may be a Belleville spring. A preferred spring has a free height to thickness ratio in the range of from about 1.35:1 to about 1.6:1. The gas bearing of this invention is used in opposed relation with another gas bearing.

19 Claims, 8 Drawing Sheets

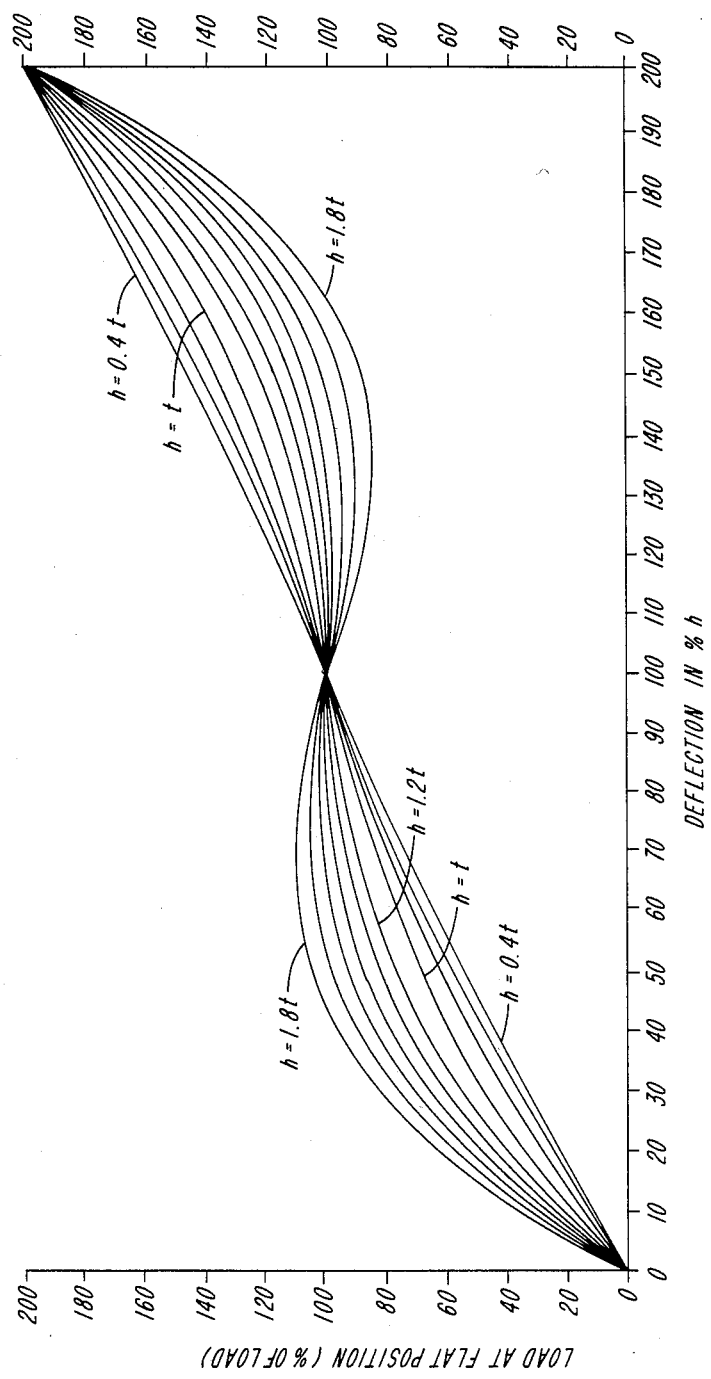

GAS BEARING FOR GUIDING RELATIVE MOVEMENT OF PRECISION MACHINE PARTS

FIELD OF THE INVENTION

This invention relates generally to fluid bearings for precision movement of machine parts with respect to one another, and, more particularly, to gas bearings which maintain a constant preload force on the bearing shoe over a range of deflections to permit accommodation of imperfections in the machine and maintenance of a precision alignment.

BACKGROUND OF THE INVENTION

In precision machines such as machine tools, coordinate measuring machines, and other like machines, gas bearings are frequently used to permit relatively frictionless movement of portions of the machine, including a carriage, along machine rails. Although the rails along which the carriage, or other portion of the machine, moves typically are rendered as smooth and as straight as possible, and the opposed sides thereof are machined to be as parallel to one another as possible, it is very difficult to make the sides of the rails exactly parallel along their entire length. Also, imperfections in the rails and in the machine parts can develop through use, and as a result of temperature variations which cause temperature induced strains in the rails or in the carriage. In addition, it may be prohibitively-pensive to machine the rails and the machine parts to the required degree of precision and to maintain them in that condition. Therefore, sometimes the rails in such precision machines are not as straight as desired or their sides are not as parallel as desired. The longer the path of travel, or the longer the rail, the more likely it is that imperfections will be found, and the more likely it is that such imperfections will cause unacceptable errors. In precision machines, even very minor imperfections in the rails, or even in very minor misalignments in the machine parts can produce significant errors Often, it is desirable to brake the carriage and lock it in place with regard to the rail while a measurement or work is being performed on the workpiece. In prior art machines, the flow of gas must be maintained during this braking procedure. Interruption of the gas supply to one or more of the air bearings would cause the bearing shoe to directly engage the rail and to brake the carriage. However, if the gas flow is interrupted, he force applied by the gas pressure to the shoe through the carriage would change. This change in the applied force on one side would cause a shift in the balance of forces that previously existed between opposed gas bearings. As a result, the carriage would shift along with the shoe with respect to the rail, thus temporarily throwing the carriage out of alignment with regard to the other parts of the machine, and causing distortion of the machine geometry. In precision machining, and in coordinate measuring machines, such distortion can cause unacceptable errors in the machined product or in the measurement being made respectively. To maintain the desired alignment of the carriage on the rail, it is desirable that a constant preload be applied through opposed gas bearings to the bearing shoe at all times, whether the carriage is moving along the rail, or whether it is stationary, and whether or not the gas bearing has gas flowing through it or not.

Several attempts have been made to solve the problem of maintaining the desired alignment of the carriage on the rails when gas bearings are used, even where there are imperfections in the rails Examples of such solutions using gas bearings are found in U.S. Pat. Nos. 3,578,827; 3,717,392; 4,643.590; 4,378,134; and 4,174,136. All of these prior art devices are mechanically complex and are subject to failure at multiple locations.

It is a general object of the present invention to provide a gas bearing which maintains a constant preload force on the bearing pad, when imperfections, including non-parallel sides, are encountered in the rails.

It is another object of the present invention to provide a gas bearing which permits braking of the carriage by interruption of the gas flow to the bearing while maintaining a constant preload force on the bearing shoe and a precise alignment of the carriage on the rail.

It is another further object of the present invention to provide a simple, efficient, economical and reliable gas bearing which can accommodate the imperfections in the rails and maintain a precise alignment of the carriage on the rails.

It is also another further object of the present invention to provide a gas bearing which provides a constant preload force whether or not gas is being supplied to the bearing.

SUMMARY OF THE INVENTION

In accordance with the above and other objects, this invention relates generally to a gas bearing for use with relatively moving parts of a coordinate measuring machine, a machine tool or other like machine which maintains the precise alignment of the machine parts with respect to one another by maintaining a constant force preload on the bearing. Means are provided on a carriage traveling over rails which exerts a constant force preload on the bearing shoe over a range of deflections of the shoe normal to the rail surface. This means typically is used in conjunction with one of an opposed pair of gas bearings. The provision of such means permits accommodation of non-parallel sides in the rails, and imperfections in the rail caused by temperature induced strains. Also, such means permits the use of materials with dissimilar coefficients of thermal expansion for the carriage and rails without distortion of the machine geometry or the preload applied by the bearings.

In a preferred embodiment, the air bearing utilizes a disc spring to provide the desired constant preload. The spring bears against a back surface of the bearing pad opposite of the bearing surface. A sphere is seated in a hole in the center of the spring, and a set screw engages the sphere to adjust force applied to the bearing pad. The set screw is mounted in the structure of the carriage. A disc spring is selected which applies a constant load over a range of deflections of its convex center portion with respect to its outer rim in a direction generally normal to the plane of the rim. In a preferred embodiment, a desired disc spring is used which has a ratio in the range of from about 1.35:1 to about 1.60:1 of the height of the spring measured from its convex center to the plane of its rim over the thickness of the spring material. A preferred spring has a height to thickness ratio of 1.41:1.

Typically, a gas bearing containing a disc spring is used in opposed relation with a gas bearing not containing a disc spring. Since movement of the bearing pad normal to the rail surface is accommodated by deflection of the spring and since the spring applies a constant preload force over that range of deflections, the pad always has a constant force applied to it and no changes in the air gap or in the position of the carriage result. When the carriage is braked with respect to the rail, the gas supply to the gas bearing having the disc spring is interrupted, causing the bearing pad to rest directly upon the rail surface. This movement of the pad with respect to the rail is accommodated by deflection of the spring which continues to apply a constant force to the bearing shoe. Thus, no shift of the carriage occurs with respect to the rail, since no imbalance of forces occurs.

In one typical application, the gas bearing of the present invention is utilized in conjunction with a coordinate measuring machine. Such a coordinate measuring machine typically includes a bridge which rides along a pair of spaced Y-rails on a base, a carriage which travels along an X-rail disposed on the bridge, and a Z-rail which rides within the carriage and moves in a direction orthogonal to both the X-rail and the Y rail. Opposed air bearings, one of which utilizes a disc spring are used in conjunction with each of the X-rail, Y-rail and Z-rail.

The gas bearing of the present invention permits the maintenance of a precision alignment of two relatively moving machine parts regardless of imperfections or non-parallel surfaces and regardless of different coefficients of thermal expansion, by maintaining a constant preload force on the bearing pad. Furthermore, the gas bearing of the present invention permits maintenance of the precision alignment during braking of the carriage by interruption of the gas flow. This invention accomplishes both of these things with a simple, economical, efficient and highly reliable construction.

DESCRIPTION OF THE DRAWINGS

The objects, advantages and features of this invention will be more clearly appreciated from the following detailed description when taken in conjunction with the accompanying drawing in which:

FIG. 3 is a graph for Belleville springs with a range of height to thickness ratios (X) in which the abscissa is the deflection of the spring in percent of its free height and the ordinate is the load in percent of the load at a flat position;

DETAILED DESCRIPTION OF THE PREFERRED EMBODIMENTS

Figure 1:
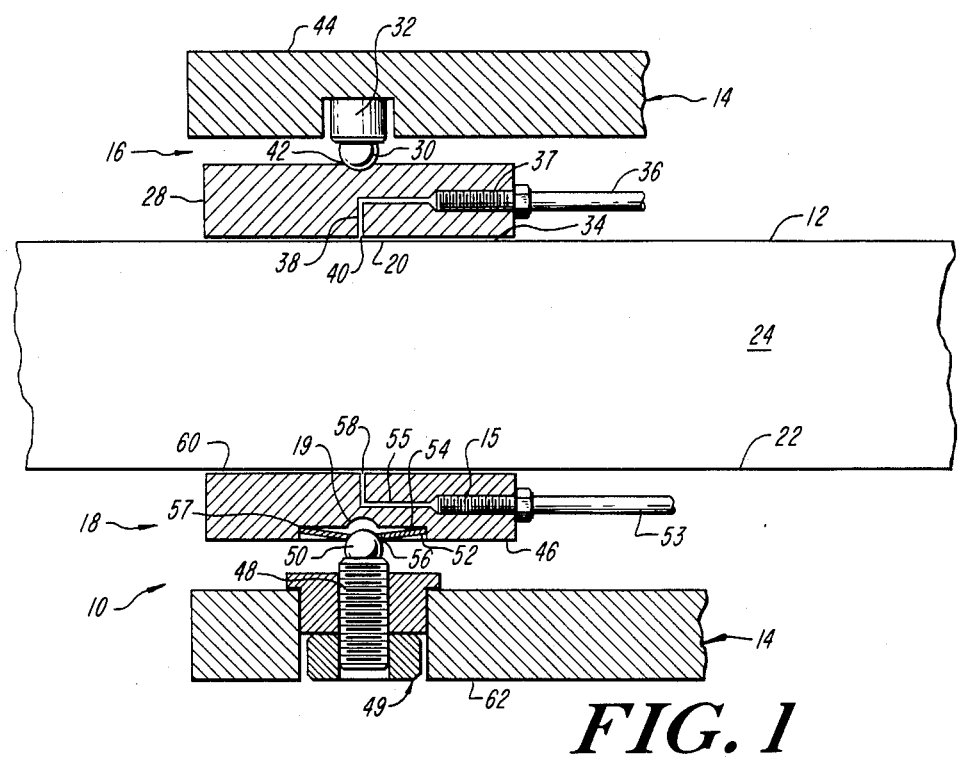
FIG. 1 is a fragmentary, diagrammatic cross-sectional view showing the air bearing system of this invention.
Figure 4:
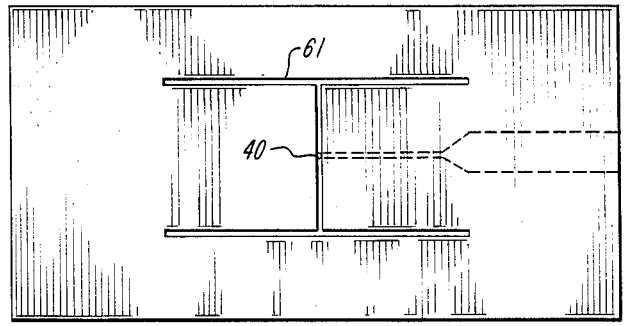
FIG. 4 is a bottom elevational view of the bearing shoe of the system of FIG. 1.

With reference now to the drawing, and more particularly to FIGS. 1 and 4 thereof, the gas bearing system 10 of the present invention will be described. Bearing system 10 is shown in conjunction with two members which are movable with respect to one another, such as a rail 12 and member 14 which rides on rail 12. Rail 12 can be any conventional rail on a coordinate measuring machine or a machine tool, and member 14 can be a carriage or a column or a table or a like movable member, or a support for such a carrige, column or table. Bearing system 10 typically is associated with and mounted onto movable member 14. Bearing system 10 is used in guiding member 14 in a rectilinear path on rail 12 with a high level of accuracy. Member 14 moves longitudinally of rail 12, or from left to right or right to left as shown in FIG. 1. Rail 12 typically is formed of steel, granite or some other solid material which provides a stable contour. Rail 12 is rectangular in cross-section and has opposed generally parallel walls 20 and 22, and generally orthogonal walls 24. Walls 20 and 22 are machined to considerable accuracy, so that preferably each wall is made to fall within one plane. However, some irregularities in wall 22 can be accommodated by bearing system 10. Wall 22 need only be approximately straight and approximately parallel to wall 20, and wall 22 may vary from a condition in which it is parallel to wall 20 within the range of normal manufacturing tolerances. Also, wall 20 need not be perfectly straight, since conventional electronic devices are available to correct errors caused by such irregularities. Typically, wall 20 is straight to within 0.0001 inch to 0.0002 inch, but deviations up to 0.0008 inch are permitted However, it is desired to maintain a precise, predetermined relationship between movable member 14 and rail 12 as member 14 travels along rail 12, regardless of such imperfections or temperature induced deflections in rail 12.

As shown in FIG. 1, bearing system 10 includes at least two gas bearings, 16 and 18. Bearings 16 and 18 are disposed on opposite sides of rail 12 and typically are disposed in directly opposed confronting relationship with one another.

However, additional pairs of opposed bearings may be used adjacent one another along the length of member 14 parallel to rail 12, if desired. Also, one bearing may be in opposed relation to more than one bearing 18 and vice versa. In addition, as will be described hereinafter, pairs of opposed bearings may be used in orthogonal orientation to bearings 16 and 18 in conjunction with orthogonal walls 24.

Bearing 16 includes a shoe 28, a ball 30, and a stud 32. Bearing shoe 28 will now be described with particular reference to FIGS. 1 and 4. Shoe 28 is a generally rectangular-shaped block, typically composed of aluminum with a hard coat, anodized surface. Shoe 28 has a bearing surface 34 which is in a closely spaced, confronting, generally parallel relationship with surface 20 of rail 12. On the surface of shoe 28 opposite of bearing surface 34 and generally centered thereon is a recess 42. Recess 42 is configured to receive ball 30, and is complimentary therewith. Recess 42 is defined by segment of a sphere which is less than a hemisphere. Shoe 28 includes a threaded port 37 adapted to accept the threaded male coupling on gas line 36 for a threadable connection therewith. Gas line 36 is coupled to a source of compressed gas. A conduit 38 extends from port 37 to a port 40 in bearing surface 34. Port 40 communicates with a channel 61 formed in bearing surface 34. Channel 61 may be H-shaped, as shown, or it can have any other convenient shape such as, for example, an "X", an "I", or a cross. Surface 34 also can be porous with no defined channel, or it can have any other configuration which provides the desired thin film of gas Port 40 is located generally at the center of channel 61 or, as shown in FIG. 4, at the center of the cross bar of the H. In use, air enters conduit 38 and exits through port 40 and passes along channel 61 and escapes between bearing surface 34 and surface 20 of rail 12 to provide the desired very thin film of gas and frictionless relationship between bearing surface 34 and surface 20. Typically, the gap between surface 34 and surface 20 is of the order of 0.0004 inch.

Ball 30 resides within recess 42 of shoe 28. Ball 30 is engaged by the forward end of stud 32. Stud 32 may be threaded through an aperture extending through housing 44 of member 14, or it may be fixedly mounted onto housing 44 and extend a predetermined distance from housing 44 toward shoe 28. Stud 32 extends generally normally of surface 20 of rail 12. A recess is provided in the end of stud 32 which is complimentary with ball 30 to provide a ball-and-socket joint between stud 32 and shoe 28. If stud 32 is threadably mounted onto housing 44, the distance between member 14 and surface 20 of rail 12 can be adjusted by adjusting the position of screw 32 within housing 44, once gas has been supplied to air line 36.

Bearing 18 is similar to bearing 16 in many respects. Bearing 18 includes a shoe 46, a screw 48, a ball 50 and a disc spring 52. Shoe 46 includes a bearing surface 60 in closely spaced confronting relation with surface 22 of rail 12. Gas line 53 is threadably coupled at one end to a source of compressed gas, and is coupled at the other end to port 15 within shoe 46. Port 15 communicates with conduit 55 and port 58 on bearing surface 60. Gas passes through port 58 and out through an H-shaped channel, as previously described for shoe 28, to provide a thin film of air between bearing surface 60 of shoe 46 and surface 22 of rail 12. Again, an almost friction-free relationship is provided between bearing surface 60 and surface 22. Recess 19, like recess 42, is disposed in the center of the back surface of shoe 46 opposite of bearing surface 60, and recess 19 is defined by a segment of a sphere which is less than a hemisphere. Ball 50 resides in a complimentary recess in the tip of screw 48. Screw 48 is threaded through housing 62 in bearing member 14 in a direction generally normal to bearing surface 60, and the position of screw 48 with respect to shoe 46 can be adjusted by rotation thereof about its axis.

Disc spring 52 is disposed between the tip of screw 48 and shoe 46. Spring 52 preferably is seated in a counter bore 54 in the back surface of shoe 46 which is concentric with and surrounds recess 19. Counter bore 54 has a diameter generally equal to that of spring 52 in its compressed condition. Spring 52 is convex outwardly toward screw 48 and away from the back surface of shoe 46. Disposed at the center of the raised, convex portion of spring 52 is a generally circular hole 56 which is smaller in diameter than ball 50. Ball 50 seats in hole 56 and extends through hole 56 and partially into recess 58 Again, a ball-and-socket joint is formed between screw 48 and ball 50. The preload applied to spring 52 and thus to shoe 46 is adjusted by adjusting the position of screw 48 with respect to housing 62. The farther screw 48 is advanced towards shoe 46, the greater is the deflection of spring 52 in a direction normal to the plane of its rim 57, and the less is the height of spring 52 from its rim 57 to a point at the apex of the spring adjacent hole 56. A means, such as a lock nut 49, is typically provided to prevent movement of screw 48 between adjustments.

Spring 52 is selected such that the force applied by spring 52 to shoe 46 remains almost constant over a range of deflections of spring 52 in a direction normal to the plane of its rim 57. Spring 52 is also selected to provide a force which matches the optimal preload for the air bearing. The preload applied to the bearing shoe has an inverse effect on the air gap A curve of this relationship would show that the greater the force becomes, the smaller the air gap is. A preload force should be selected on this curve where the slope is the steepest, i.e., where changes in the force applied produce the smallest changes in the air gap. Once the desired preload has been determined, a spring 52 should be selected in which the force applied by spring 52 over a range of deflections equals the desired preload. Such a choice allows the air bearings to ride on a nearly constant film of air and provides the air bearing with the maximum stiffness.

The size of the gap between bearing surface 60 and surface 22 and the size of the gap between bearing surface 34 and surface 20 are a function of the preload applied by spring 52. Therefore, if the preload applied by spring 52 remains constant, the gap between bearing surface 60 and surface 22 and the gap between bearing surface 34 and surface 20 remains constant, and the relative position of member 14 on rail 12 remains unchanged.

Figure 2:
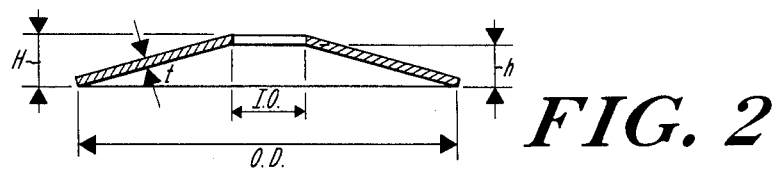
FIG. 2 is a cross-sectional side elevational view of a Belleville spring.

A preferred disc spring is a Belleville spring. A graph showing the properties of different Belleville springs having different configurations is shown in FIG. 3. The abscissa of FIG. 3 is the deflection of the Belleville spring, in percent, relative to the free height H of the spring. H is the distance from the apex adjacent hole 56 to the plane of rim 57 measured normal to the plane of rim 57. The ordinate of FIG. 3 is the ratio of the load applied to the spring over the load applied to the spring when in a flat position, in percent. Each curve of FIG. 3 is drawn for a particular X value of a spring, where X is defined as the free height (h) of the spring, as previously defined, over its thickness (t) In other words, X is a height to thickness ratio. These variables are illustrated in FIG. 2. The ratio of the load applied divided by the load necessary to flatten the spring may be determined from the following equation:

$$P/_{PF} = X^2(Y - Y^2/2)(1-Y) + Y$$

where X equals h/t and Y equals F/h. F equals the deflection of the spring in a direction normal to the plane of rim 57. It can be seen that for X values in the range of from about 1.3 to about 1.6, the load applied to the spring, and thus the load applied by the spring, remains nearly constant for deflections in the range of from about 60 to about 100 percent. The preferred range for the X value for Belleville springs used in this invention is from about 1.35 to about 1.60. It has been found that the preferred spring has an X value of about 1.41. It has also been found that for X-values less than 1.35, the force applied varies too much with deflections of spring 52. For X values of greater than 1.60, the spring can be temporarily deformed inwardly toward shoe 46 if screw 48 is tightened too much during the adjustment of the air gap.

Such a spring which falls within the preferred range provides a substantially constant force over a range of deflections of from about 75% to about 125% of its free height (h). Spring 52 can be deformed beyond its flat position as shown in FIG. 3, and still provide a constant force. However, since the counterbore 54 shown in FIG. 1 is flat, in the embodiment of FIG. 1, deflection of spring 52 is practically limited to 100%. Thus, if the deflection of spring 52 is maintained in this range, the preload applied to shoe 46 remains substantially constant. As a consequence, if imperfections are present on surface 22 of rail 12, they can be accommodated by movement of shoe 46 with respect to screw 48, normal to bearing surface 60. This movement normal to surface 60 is absorbed by deflection of spring 52. Therefore, the air gap between bearing surface 60 and surface 22 of rail 12 remains relatively constant. Because the preload applied to shoe 46 remains relatively constant, the preload applied by shoe 28 to surface 20 also remains relatively constant, thereby maintaining relatively constant the size of the air gap between bearing surface 34 and surface 20. The balance of forces remains constant. In this way, no shift of member 14 occurs with regard to rail 12, and the alignment of member 14 is maintained. Thus, spring 52 permits use of materials with different coefficients of thermal expansion in rail 12, bearings 16 and 18 and member 14 without affecting the air gaps between bearing surface 34 and surface 20, and bearing surface 60 and surface 22 over a normal range of temperatures.

Screw 48 is used to adjust the air gap between surface 60 and surface 22. Adjustment of the air gap is accomplished by turning screw 48 until the air gap collapses entirely and surface 60 rests on surface 22. Screw 48 is then loosened until the spring is within a range of deflection in which the force applied is constant, or in the range of about 75 percent to about 100 percent of its free height, as shown FIG. 3. In one example, ball 50 is retracted approximately 0.01 inch. In this example, this adjustment provides a preload force of about 100 pounds and an air bearing gap of about 0.0004 inches over a range in which surfaces 20 and 22 are parallel within plus or minus 0.010 inch. Since spring 52 is chosen to provide a force which matches the desired preload for the air bearing, screw 48 can be selected so that it has a range of adjustments for setting the air gap between bearing surface 60 and surface 22 which is approximately an order of magnitude greater than the desired air gap. Thus, great precision can be obtained in setting the air gap. Screw 48 preferably also simultaneously adjusts the air gap between surface 34 and surface 20. However, stud 32 could also be provided with threads to allow independent adjustment of the distance between surface 20 and member 14.

Another advantage of the gas bearing of this invention is that it can be used as a brake to fix the position of member 14 with regard to rail 12, without altering the alignment of member 14 with respect to rail 12, or with respect to the other elements of the machine. Braking is accomplished by interrupting the gas to line 53, and allowing surface 60 to collapse onto surface 22. This movement of shoe 46 normal to surface 22 is absorbed by deflection of spring 52. Since the air gap is of the order of 0.0004 inches, the deflection of spring 52 is minimal, and is within the range of deflections of spring 52 which still provides a constant preload force on shoe 46. As a result, the force applied by spring 52 on shoe 46 remains constant, and the force seen by shoe 28 also remains unchanged, and the balance of forces between shoe 28 and shoe 46 is maintained constant. Also, spring 52 is rigid in a lateral direction (i.e., in a direction parallel to bearing surface 60), thus preventing movement of shoe 46 parallel to surface 22. As a consequence, there is no shift of member 14 with regard to rail 12. Thus, even during braking, the precise alignment between member 14, rail 12 and other elements of the machine is maintained.

Figure 5:
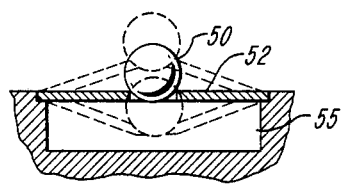
FIG. 5 is a fragmentary, partial, cross-sectional view showing an alternative configuration of the bearing of FIG. 1.
Figure 5A:
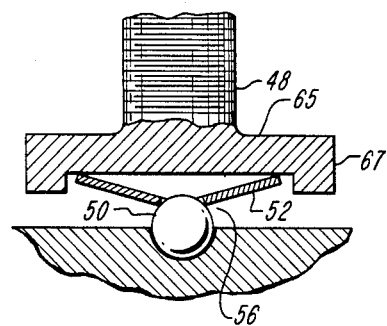
FIG. 5a is a fragmentary, partial cross-sectional view showing another alternative configuration of the bearing of FIG. 1.
Figure 5B:
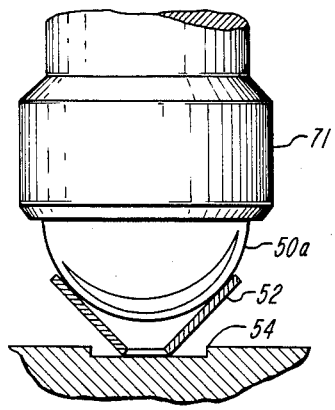
FIG. 5b is a fragmentary, partial cross-sectional view showing another alternative configuration of the bearing of FIG. 1.

As shown in FIGS. 5, 5A and 5B, spring 52 can have alternative configurations. FIG. 5 shows a recess 55 provided in counterbore 54 to allow spring 52 to deflect past its flat position to increase the amount of movement permitted with respect to the shoe, so long as spring 52 remains in the flat portion of the curve of FIG. 3. FIGS. 5A and 5B show configurations in which spring 52 is inverted. In FIG. 5A, an enlarged tip 65 is provided for screw 48 which has lip 67 to restrain lateral movement of spring 52. FIG. 5B, a ball 50A rests in spring 52 in its inverted position, and spring 52 resides in counterbore 54. A ball 50A is accepted by a recess in the tip of screw 48 formed by retaining walls 71.

Figure 6:
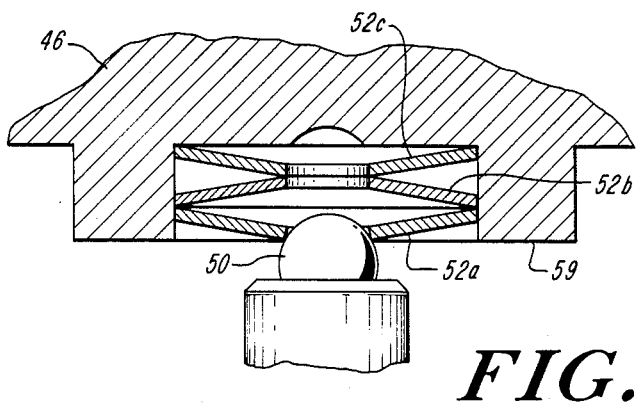
FIG. 6 is a fragmentary, diagrammatic cross-sectional view showing another alternative embodiment of this invention.

Another alternative embodiment of gas bearing 18 will now be described with reference to FIG. 6. Instead of one spring 52, three springs 52a, 52b and 52c can be used in bearing 18 disposed between ball 50 and shoe 46. If the springs 52a, 52b and 52c are stacked in opposed relation as shown in FIG. 5, the spring rate is reduced by one third, the curve shown in FIG. 3 is flattened so that a constant force is applied over a greater range of deflections and the potential for variations in the force applied is reduced. Such an arrangement is preferred where the opportunity for pitch, roll or yaw is higher and greater stability must be imparted to the bearing system. Pitch, roll and yaw are a particular problem during braking. A boss 59 having a circular cross-sectional shape is provided on the backside of shoe 46 for containment of springs 52a, 52b and 52c. If springs 52a, 52b and 52c were stacked in a similar orientation, the spring rate would be increased by a factor of three, an undesirable result, since the slope of the curve in FIG. 3 would be increased and not decreased. Also, springs 52 could be used in any number of opposed combinations, such as 2, 3, 4, 5, 6, etc. to provide the desired result.

Figure 7:
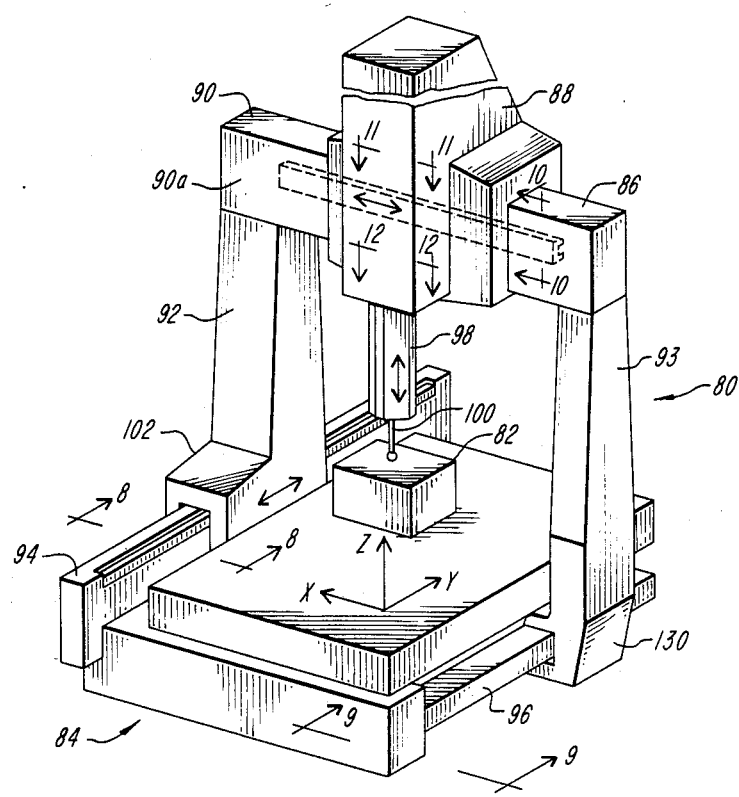
FIG. 7 is a pictorial, perspective view showing a coordinate measuring machine utilizing the gas bearing system of the present invention.

One exemplary application of gas bearing 10 will now be described with particular reference to FIG. 7. FIG. 7 illustrates a coordinate measuring machine 80 which is used for dimensional inspection of a workpiece 82, such a machine part. Machine 80 includes a base assembly 84, a bridge 86 and a carriage 88. Carriage 88 is movable horizontally, or in an X direction, along guideways on X-rail 90. X-rail 90 is carried by vertical support members 92 and 93 which, together with the X-rail 90, form bridge 86 which is movable in the Y direction along Y-rails 94 and 96 which are mounted on base assembly 84. Support member 92 rests on base 102 which rides on Y-rail 94, and support member 93 rests on base 130 which rides on Y-rail 96. A Z-rail 98 carries a probe 100 on its lower, distal end. Probe 100 may be brought into contact with points on the surface of workpice 82 for measurement of the coordinates of those points. Gas bearings, such as the bearing shown in FIGS. 1–6, are utilized to allow relatively frictionless movement of support member 92 along rail 94, support member 93 along rail 96, carriage 88 along X-rail 90, and Z-rail 98 with respect to carriage 88.

Figure 8:
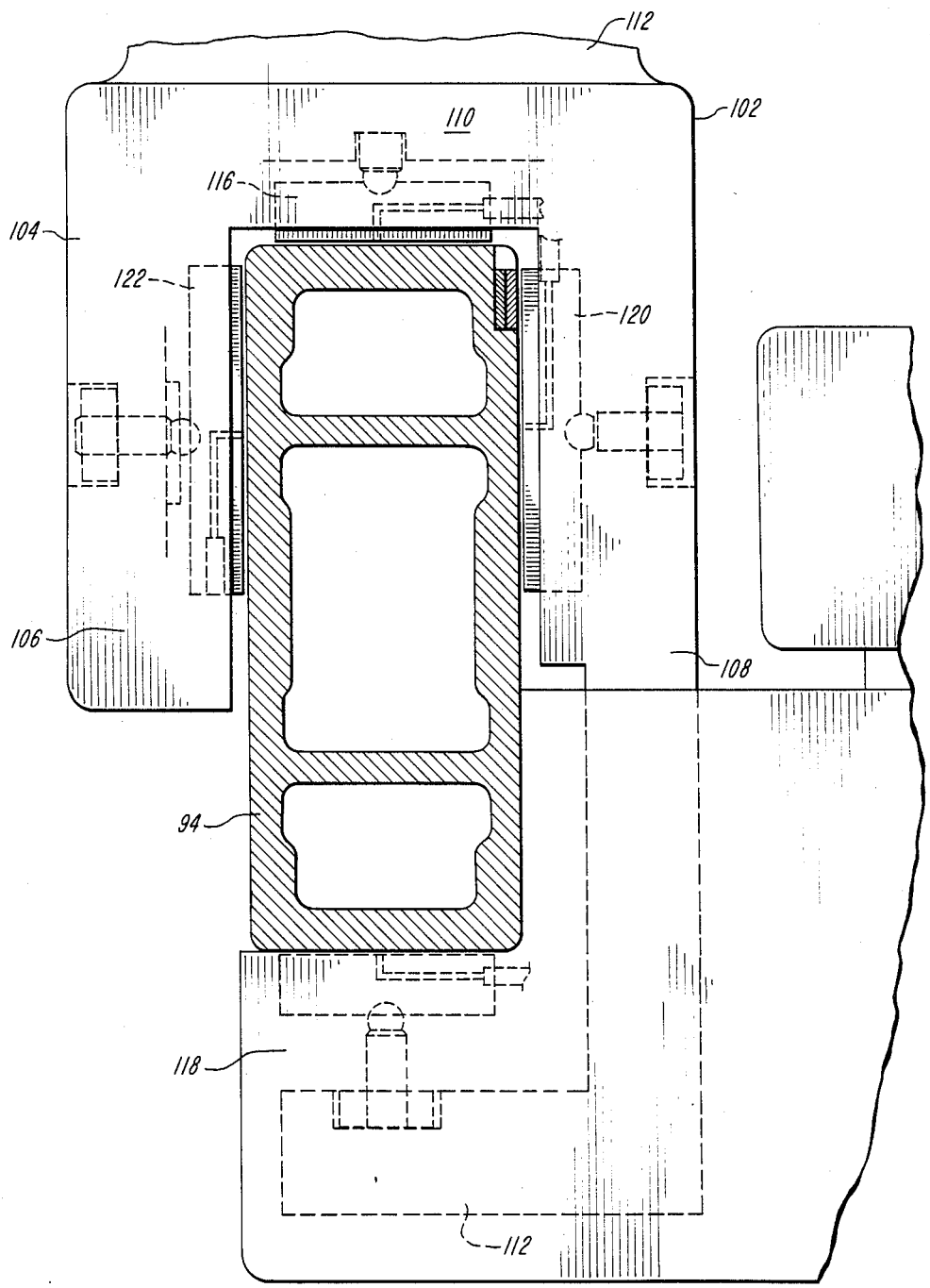
FIG. 8 is a fragmentary cross-sectional view taken along the line 8—8 of FIG. 7.

The gas bearings used in conjunction with movement of support member 92 along rail 94 will now be described with particular reference to FIG. 8. Base 102 includes an inverted, generally U-shaped section 104 which sits on top of rail 94. U-shaped section 104 includes arms 106 and 108 and a base 110. An L-shaped member 112 extends downwardly from arm 108 and passes beneath rail 94 to provide additional stability. Seven gas bearings are provided. Two bearings 116 are in opposed relation with one bearing 118. Two bearings 120 are in opposed relation with two bearings 122 Arm 108 includes gas bearings 120, while arm 106 on the outside surface of rail 94 has mounted therein gas bearings 122 which are in opposed relation with bearing 120 and which include spring 52 of this invention. Gas bearings 120 and 122 as shown in FIG. 8 are identical in construction to bearings 16 and 18 respectively shown in FIG. 1. Similarly, two gas bearings 116 are disposed in base 110, while one bearing 118 is disposed in member 112 in opposed relation with bearings 116. Bearing 118 is identical in construction to bearing 18 shown in FIG. 1, while bearings 116 are identical in construction to bearing 16 shown in FIG. 1. In the embodiment of FIG. 8, the opposed bearings 120 and 122 and 116 and 118, permit support member 92 to ride over rail 94 in a smooth, virtually friction-free relation. Furthermore, the provision of bearing 118 in the vertical direction, and of bearings 122 in the horizontal direction permits accommodation of imperfections in rail 94 along both horizontal and vertical surfaces thereof, to maintain the precise alignment of member 92 on rail 94, and to maintain the precise alignment of support member 92 with respect to the other elements of machine 80.

The use of the gas bearings of this invention in conjunction with movement of support member 93 along rail 96 will now be described with particular reference to FIG. 9. Base 130 of support member 93 includes a generally U-shaped member oriented sideways and having legs 132 and 134 and base 136. Legs 132 and 134 contain air bearings 140 and 138 respectively in opposed relation. In the preferred embodiment, leg 134 includes air bearing 138 which is identical in construction to bearing 18 as shown in FIG. 1, while leg 132 includes bearing 140 which is identical in construction to bearing 16 as shown in FIG. 1. Only one set of opposed bearings is required in the embodiment of FIG. 9, since lateral alignment of bridge 86 is maintained by the interaction of rail 94 and base 102. Rail 96 need only support base 130 in a vertical direction.

The use of the gas bearings of this invention in conjunction with the movement of carriage 88 along X-rail 90 will now be described with particular reference to FIG. 10. Carriage 88 includes a top support 150, a bottom member 152, and two side members 154 and 156. Side member 154 includes three bearings 141 (the third one is behind the top one shown in FIG. 10) which contain a Belleville spring and which are identical in construction to bearing 18 of FIG. 1. Member 156 contains three bearings 142 which are in opposed relation to three bearings 141 and which are identical in construction to bearing 16 of FIG. 1. Member 152 contains a bearing 158 disposed in opposed relation with two bearings 160 (one behind the other) in top support 150. Bearing 158 contains a Belleville spring and is identical to bearing 18 of FIG. 1, while bearings 160 are identical to bearing 16 of FIG. 1. The positions of bearings 141 and 142 could be reversed so that bearings 141 reside in member 156 and bearings 142 reside in member 154. However, it is preferred that bearings 141 utilizing Belleville spring 52 be disposed on the outside member 154 of carriage 158 on the opposite side of X-rail 90 from Z-rail 98.

Figure 9:
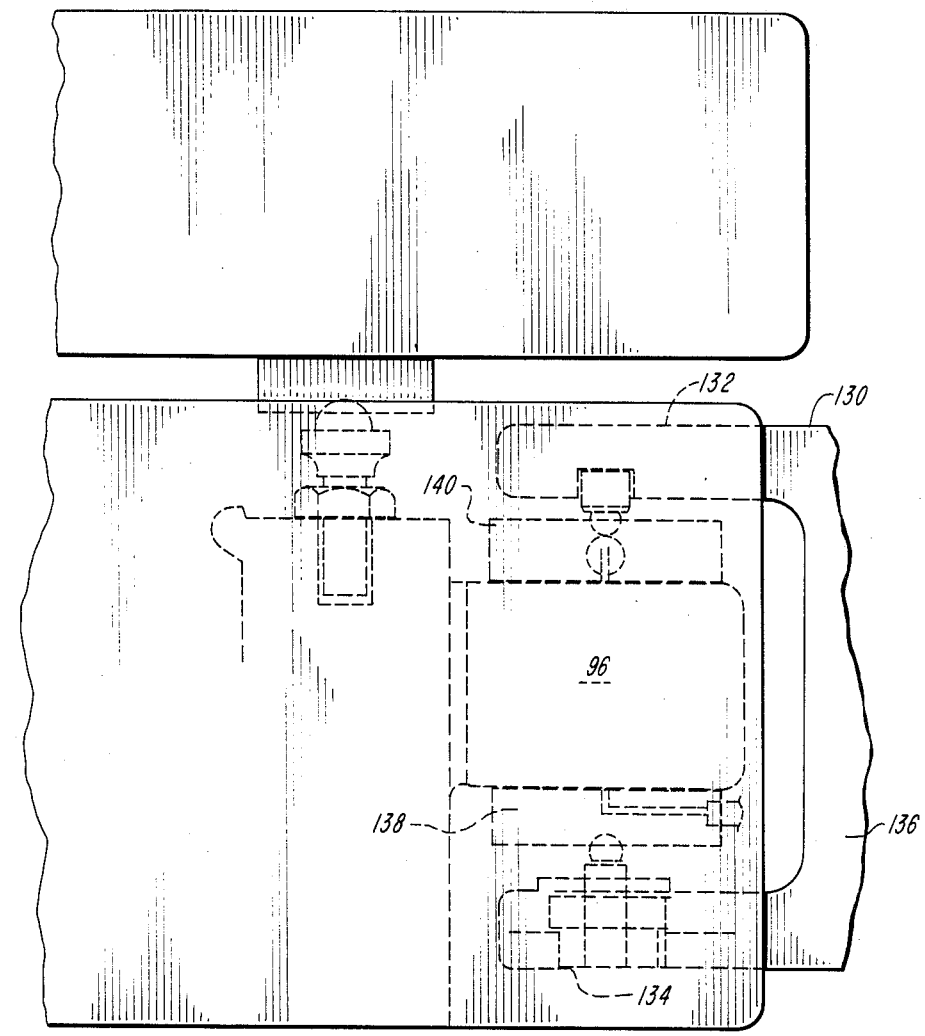
FIG. 9 is a fragmentary cross-sectional view taken along the line 9—9 of FIG. 7.
Figure 10:
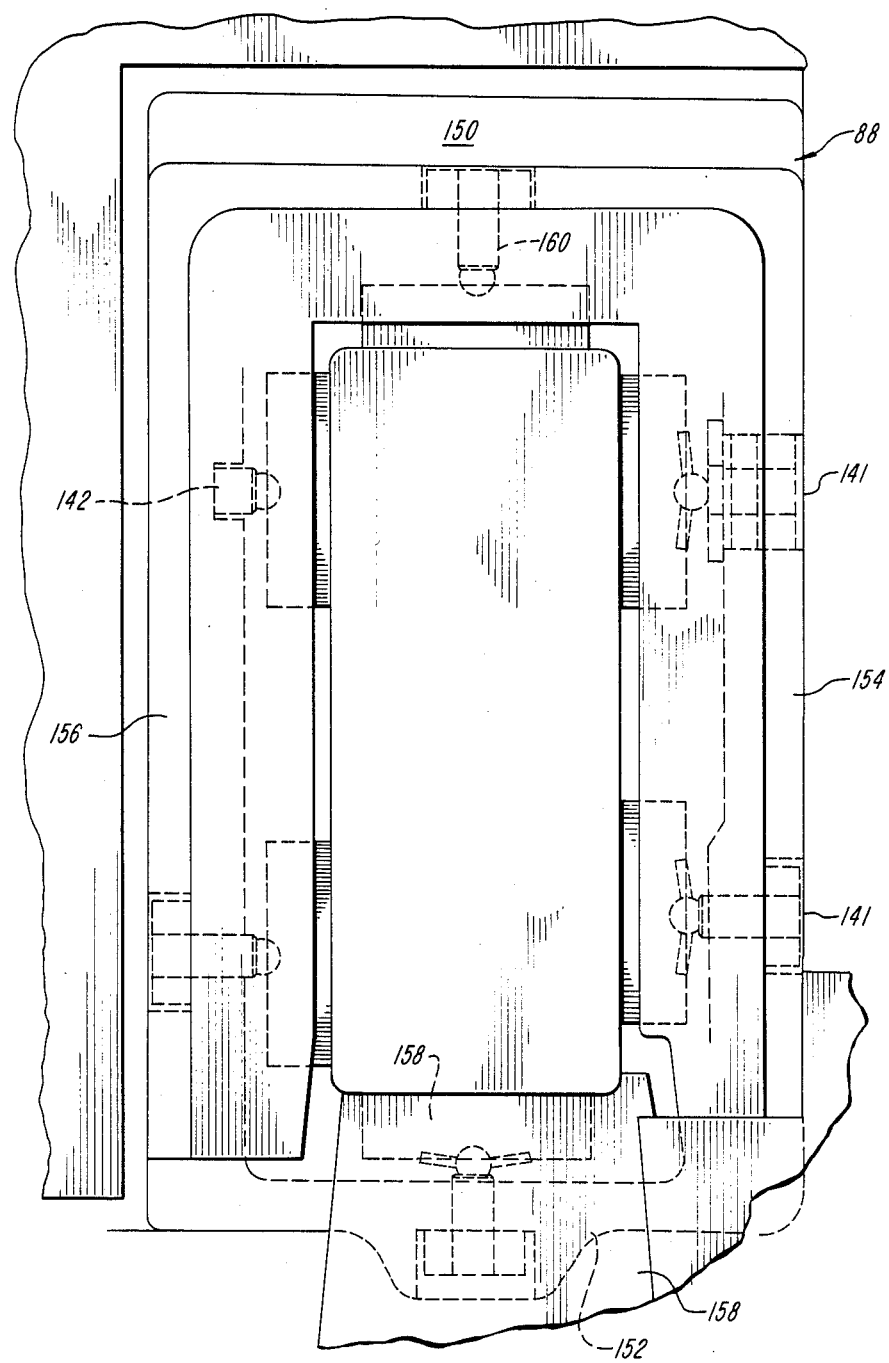
FIG. 10 is a fragmentary cross-sectional view taken along the line 10—10 of FIG. 7.

It can be seen by reference to FIGS. 8–10, in each instance, that a gas bearing identical to bearing 18 of FIG. 1, and utilizing a Belleville spring is disposed in a member of its associated apparatus which is not a primary load bearing member. A bearing identical to bearing 16 is always found in the primary load bearing member, such as base 110 of FIG. 8, leg 132 of FIG. 9, and top support 150 of FIG. 10. This arrangement is preferred, to prevent the full weight of bridge 86 or carriage 88 from being placed on a gas bearing containing Belleville spring 52. As a consequence, the forces applied to spring 52 are within the range of those which can be accepted by the spring without deforming the spring, or without completely flattening the spring outside of the preferred range, as shown in FIG. 3, during normal operation so that it can no longer deflect in a direction normal to the plane of its rim to perform its desired function. In FIG. 8, the location of bearings 120 and 122 is less important, although it is preferred that bearings 122 be placed on the outside arm 106, and that bearings 120 be placed on arm 108.

Figure 11:
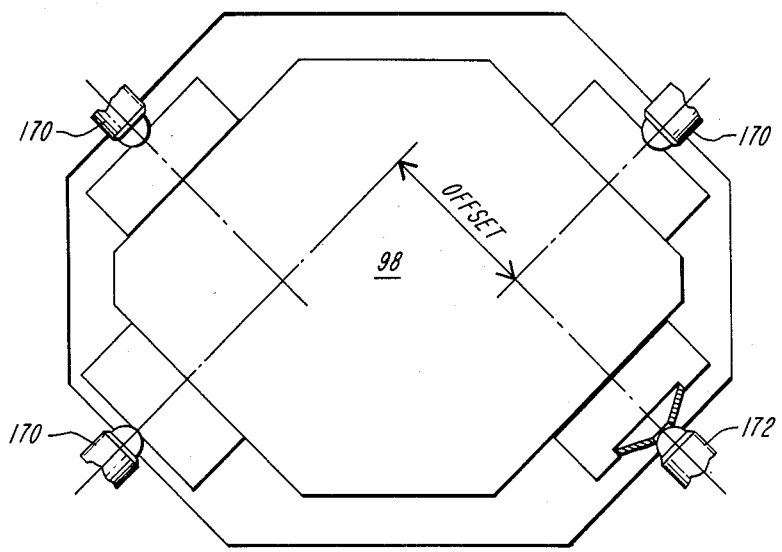
FIG. 11 is a fragmentary cross sectional view taken along the line 11—11 of FIG. 7.
Figure 12:
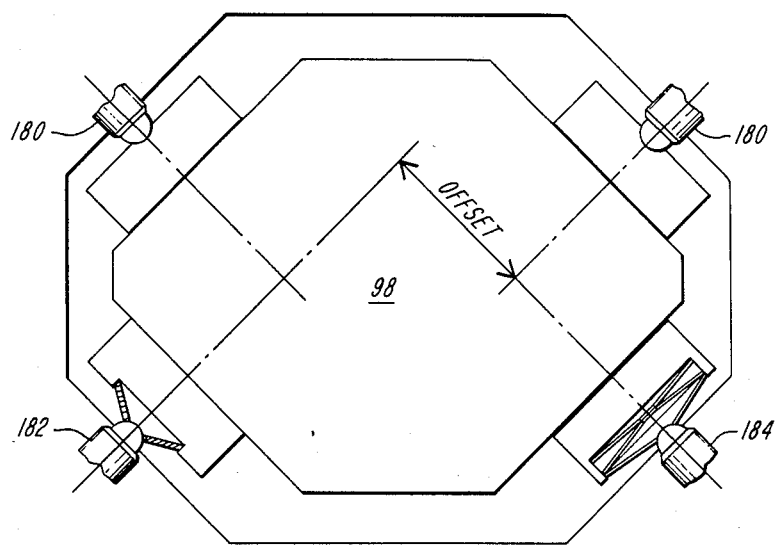
FIG. 12 is a fragmentary/cross sectional view taken along the line 12—12 of FIG. 7

The use of the gas bearings of this invention in conjunction with the movement of Z rail 98 in carriage 88 is shown in FIGS. 11 and 12. Two sets of opposed, offset bearings are used at two different locations on Z-rail 98. At an upper location, as shown in FIG. 11, three bearings 170 and one bearing 172 are utilized. Bearing 172 is provided with a Belleville spring and is identical in construction to bearing 18 of FIG. 1. Bearings 170 are each identical in construction to bearing 16 of FIG. 1. As can be seen from FIG. 11, Z-rail is typically hexagonal in cross-sectional shape, although it could also be rectangular or octagonal in shape. As long as the opposed relationship is maintained these bearings can be used in conjunction with any opposed surfaces of Z-rail 98. However, bearings 170 and 172 preferably are not used in conjunction with surfaces of Z-rail 98 which are parallel to X-rail 90 and preferably bearings 170 and 172 are symmetrically disposed about the axis of Z-rail 98.

FIG. 12 shows the bearings used at the other position along Z-rail 98 to prevent roll, pitch or yaw of Z-rail 98. In FIG. 12, two bearings 180 are used and one bearing 180 is in opposed, offset relation with bearing 182, while the other bearing 180 is in opposed, offset relation with a bearing 184. Bearings 180 each are identical in construction to bearing 16, while bearing 182 is identical in construction to bearing 18. Bearing 184 contains three stacked springs and is identical in construction to the embodiment shown in FIG. 6. In all other respects, the arrangement of FIG. 12 is like that of FIG. 1.

It is to be understood that while, bearing 118, 122, 138, 141 and 172 are identical in construction to bearing 18 and while bearings 116, 120, 140, 142 and 170 are identical in construction to bearing 16, the bearing pads of each bearing can be of a different size and configuration to suit the needs of the particular application. For instance, bearing 172 has a pad of 1 inch by 2 inches while bearing 141 has a bearing pad of 2 inches by 3 inches.

The foregoing description of the location of the gas bearings of this invention in a coordinate measuring machine is intended to be exemplary only. It is understood that the location and number of bearings can be adjusted to suit the needs of a particular machine, so long as sufficient support is provided on one hand and the machine is not overly constrained on the other hand. Over constraint occurs where the bearings fight each other, and insufficient support is provided if there is little or no resistance to rotation of the carriage with respect to the rail.

The gas bearing of the present invention typically is used in conjunction with a conventional source of pressurized air. This gas bearing permits the application of a constant preload to the bearing shoe, and thus the maintenance of a constant air gap between the bearing shoe and the rail regardless of imperfections in a surface of the rail, and regardless of temperature variations which may cause distortion or non-parallelism in the opposed surfaces of the rail. Typically, gas bearings of this invention are used in opposition wherein one or more gas bearings not containing a Belleville spring are disposed opposite one or more containing a Belleville spring. Such an arrangement is desirable in a coordinate measuring machine However, two opposed bearings containing Belleville springs could be used in some applications. The gas bearing containing a Belleville spring is used preferably in conjunction with the surface of the rail which is not the primary load bearing surface and typically with a surface which need not be machined to quite the same tolerances as the other. However, the bearing containing a Belleville spring could be used in conjunction with the load bearing member if the spring were of sufficient strength and if there were a sufficient number of load bearing gas bearings. Also, the bearing containing the spring can be used with the smoother of the two rail surfaces.

The use of the gas bearing of this invention permits the use of materials with different coefficients of thermal expansion in the rail, air bearings and carriage without temperature changes affecting the air gap between the bearing shoe and the rail, if temperatures are maintained in a normal range of from about 0 degrees C. to about 40 degrees C.

In the particular applications of this invention shown in FIGS. 8-10, a Belleville spring having the following characteristics is preferred: H=0.062 inch; O.D.=1.00 inch; I.D=0.25 inch; t=0.025 inch; h=0.037 inch and h/t=1.48. For the application shown in FIGS. 11 and 12, a Belleville spring having the following characteristics is preferred: H=0.042 inch; O.D. 32 0.75 inch; I.D.= 0.25 inch; t=0.017 inch; h=0.025 inch; and h/t=1.47 inch However, so long as the spring chosen provides a constant force of a specific magnitude (i.e., 100 pounds) over a range of deflections, other springs having different sizes and height to thickness ratios can be used.

Although the gas bearing of this invention has been described with respect to a stationary beam and a movable carriage, the situation could be reversed, and the carriage could be stationary and the beam movable with respect thereto. In addition, although this invention has been described with particular reference to a carriage which surrounds a generally rectangular beam, this invention could also be used with a carriage which rides in a channel and which is guided between two opposed walls by the bearings of the present invention. In this instance, the carriage bearing surfaces would face outwardly away from the carriage against the opposed walls of the channel. The bearings of this invention would accommodate opposed walls that were not entirely parallel, or walls in which there were imperfections, to maintain the desired preload and air gap as previously described. Furthermore, the gas bearing of this invention could be used with a round beam surrounded by a carriage, if an anti-rotation rail were used.

The gas bearing of this invention permits the maintenence of a constant preload while accommodating imperfections in the rail, such as non-parallelism and temperature induced deformations, utilizing a rather inexpensive and simple structure which is highly reliable and which can be easily introduced into existing machine structures without significant alteration of their design. Furthermore, the gas bearing of this invention permits the machine to be braked in a desired location without causing misalignment of the machine parts with respect to one another.

In view of the above description, it is likely that modifications and improvements may occur to those skilled in the art within the scope of this invention. Thus, the above description is intended to be exemplary only, the scope of the invention being described in the following claims and their equivalents.

What is claimed is:

1. A system for guiding movement of one member relative to another member comprising:

a first rigid member having first and second opposed generally parallel surfaces which are relatively planar;

a second member, said second member and said first member being relatively movable with respect to one another in a direction generally parallel to said opposed surfaces of said first member;

a first gas bearing disposed in said second member, said first gas bearing having a first bearing shoe with a bearing surface disposed in closely spaced, confronting relation with said first surface of said first member;

a second gas bearing disposed in said second member, said second gas bearing having a second bearing shoe with a bearing surface disposed in closely spaced, confronting relation with said second surface of said first member; and means associated with said second gas bearing for applying a substantially constant force to said second bearing shoe over a range of movement of said second bearing shoe with respect to said second member in a direction generally normal to said second surface of said first member.

2. A system as recited in claim 1 wherein said applying means comprises:

a disc spring disposed on a back surface of said second bearing shoe opposite of and generally parallel to said second bearing surface, said spring having a center and a rim spaced from said center generally residing in a plane, said spring being formed of a material having a thickness, said spring having a convex shape so that the center thereof is bowed outwardly away from said back surface of said second bearing shoe; and second means for applying a force to said center of said spring.

3. The system as recited in claim 2 wherein said spring is a Belleville spring.

4. A system as recited in claim 2 wherein said spring applies a substantially constant force to said back surface of said second bearing shoe over a range of deflections of said spring in a direction generally normal to said back surface of said bearing shoe.

5. A system as recited in claim 4 wherein the ratio of the free height of said spring measured without the application of force from said plane of said rim of said spring to said center of said spring normal to said plane of said rim over the thickness of the material comprising said spring is in the range of from about 1.35 to about 1.60.

6. A system as recited in claim 2 wherein said second force applying means comprises means for varying the deflection of said spring in a direction generally normal to said back surface.

7. A system as recited in claim 6 wherein said second force applying means comprises a screw threadably mounted in said second member.

8. A system as recited in claim 1 wherein said first member is a rail, and said second member is a carriage movable with respect to said rail, and wherein said first gas bearing and said second gas bearing are disposed in opposed relation.

9. A bearing system comprising:
a first member defining first and second opposed rigid walls, said walls being relatively planar and generally parallel to one another;
a second member, said second member and first member being relatively movable with respect to one another;
a first gas bearing disposed in said second member and having a shoe in closely spaced, confronting relation with said first wall of said first member;
a second gas bearing disposed in said second member, said second gas bearing having a shoe in closely spaced, confronting relation with said second wall of said first member;
means for applying a force to said second bearing shoe; and
a disc spring disposed between said second bearing shoe and said applying means for transmitting a substantially constant force from said applying means to said second bearing shoe over a range of relative motion between said applying means and said second bearing shoe in a direction generally normal to said second wall of said first member.

10. A system as recited in claim 9 wherein said disc spring comprises a generally convex member having generally circular cross-sectional shape.

11. A system as recited in claim 10 wherein said transmitting means comprises a Belleville spring.

12. A system as recited in claim 11 wherein said disc spring includes a center and a rim spaced from said center generally residing in a plane, and wherein said disc spring is formed of a material having a thickness, and wherein said disc spring has a ratio in the range of from about 1.35 to about 1.60 of its free height measured without the application of force as the distance from said center to said plane of said rim in a direction normal to said plane of said rim over said thickness of said material forming said disc spring.

13. A system as recited in claim 10 wherein said force applying means is adjustable to deflect said disc spring over a range of deflections generally normal to said second wall of said first member.

14. A system as recited in claim 13 wherein said force applying means comprises a screw threadably mounted in said second member and a tip for engaging said force transmitting means.

15. A coordinate measuring machine comprising:
a base;
a Y-rail mounted on said base;
a support member slidable along said Y-rail and having a first pair of opposed gas bearings to facilitate movement of said support member with respect to said Y-rail;
an X-rail aligned in a direction generally orthogonal to said Y-rail and mounted on said support member;
a carriage slidable along said X-rail and having a second pair of opposed gas bearings to facilitate movement of said carriage with respect to said X-rail;
a Z-rail mounted on said carriage and slidable in a direction generally normal to said X-rail and said Y-rail, said Z-rail having a third pair of opposed gas bearings mounted in said carriage to facilitate movement of said Z-rail with respect to said carriage;
each of said first, second and third pair of opposed gas bearings having at least one gas bearing comprising:
a bearing shoe having a bearing surface adapted to ride in closely spaced, confronting relation with a surface of an associated one of said X-rail, Y-rail and Z-rail;
means for applying a force to said shoe in a direction generally normal to said bearing surface; and
a disc spring disposed between said force applying means and said shoe for transmitting a substantially constant force to said shoe in a direction generally normal to said bearing surface over a range of movement of said force applying means with respect to said shoe in a direction generally normal to said bearing surface.

16. A coordinate measuring machine as recited in claim 15 wherein said disc spring comprises a convex member having a generally circular cross-sectional shape.

17. A coordinate measuring machine as recited in claim 16 wherein said disc spring comprises a Belleville spring having a center and a rim spaced from said center generally residing in a plane, said spring being formed of a material having a thickness, said spring having a ratio in the range of from about 1.35 to about 1.60 of its free height measured without the application of force from said plane of said rim of said spring to said center of said spring in a direct generally normal to said plane of said base over said thickness of the material forming said spring.

18. A coordinate measuring machine as recited in claim 17 wherein said force applying means comprises a ball seated in a hole in the center of said disc spring and a screw having a tip engaging said ball.

19. A gas bearing comprising:
a bearing shoe having a bearing surface adapted to ride in closely spaced, confronting relationship along an opposed bearing surface, said bearing shoe having a rear surface disposed on a side of said shoe opposite of said bearing surface;

means for supplying a gas to said bearing shoe to provide a film of gas between said bearing surface and said opposed bearing surface;

means for applying a force to said rear surface of said baring shoe in a direction generally normal to said bearing surface of said shoe; and a convex disc spring disposed between said applying means and said rear surface of said shoe for transmitting a force from said applying means to said shoe, said disc spring having a center and rim spaced from said center generally residing in a plane, said spring being formed of a material having a thickness, said disc spring having a ratio of a free height of said disc spring measured without the application of force from said plane of said rim to said center of said spring in a direction normal to said plane of said rim over said thickness of said material forming said disc spring in the range of from about 1.35 to about 1.60.

* * * * *